United States Patent [19]

Gibble et al.

[11] 3,994,943

[45] Nov. 30, 1976

[54] DEWAXING OF VEGETABLE OILS

[75] Inventors: Walter P. Gibble, Brea; Joon S. Rhee, Anaheim, both of Calif.

[73] Assignee: Hunt-Wesson Foods, Inc., Fullerton, Calif.

[22] Filed: Dec. 30, 1974

[21] Appl. No.: 537,125

[52] U.S. Cl. .................................... 260/424; 210/21

[51] Int. Cl.$^2$ ........................................... B01D 11/04

[58] Field of Search ............. 260/420, 424; 210/21, 210/259, 205

[56] References Cited

UNITED STATES PATENTS

| | | | |
|---|---|---|---|
| 881,082 | 3/1908 | Krause | 210/205 X |
| 2,248,177 | 7/1941 | Karlstrom | 210/205 |
| 2,525,702 | 10/1950 | Mattikow | 260/420 |
| 2,881,195 | 4/1959 | Hayes et al. | 260/424 |
| 3,093,667 | 6/1963 | Fiala | 260/424 |
| 3,839,206 | 10/1974 | Welch | 210/259 |

*Primary Examiner*—Frank A. Spear, Jr.

[57] ABSTRACT

Crude vegetable oil is dewaxed by admixture with a mixture of surfactants comprising an aqueous solution of less than 100 ppm of a sulfosuccinate alkyl ester such as dioctyl sodium sulfosuccinate and 0.01 to 0.5% of a fatty acid sulfate such as sodium lauryl sulfate. The oil is then centrifuged and washed. The oil can be simultaneously degummed by the addition of a phosphate compound to the treatment liquid.

10 Claims, 2 Drawing Figures

DEWAXING OF VEGETABLE OILS

BACKGROUND OF THE INVENTION

1. Field of the Invention

The present invention relates to the refining of vegetable oils and, more particularly, to the dewaxing of crude sunflower seed oil.

2. Description of the Prior Art

New and better sources of food are required to satisfy the needs of expanding world population. Oil seeds such as soybean, sunflower, peanut, cottonseed, rapeseed, sesame and safflower are promising and readily available sources for food. Though the sunflower has been recognized for many years, it has only recently gained an important position in the world food supply and the present production of sunflower seed as a source of oil and protein represents about 10% of the world production of fatty oils. Sunflower oil has some very attractive properties as an edible oil because of its unsaturated, fatty acid composition and it can be cultivated with good yield.

However, sunflower oil contains a significant amount of wax which is difficult to remove and has a tendency to cloud the oil when stored at room or colder temperatures. This wax fraction is unsaponifiable and has a high melting point and low solubility. A cloudy precipitate will be found in refined and bleached oil at refrigerator temperature or even at room temperature if these waxes are not removed from the oil.

The conventional procedure for refining sunflower oil proceeded by a conventional lye refining at 70°–90° C followed by bleaching and then chilling of the oil to a low temperature to precipitate the wax. The waxes are then removed by filtration and the oil is deodorized. The filtration is a difficult, slow and expensive process requiring large filtering capacity and high labor requirements.

A recently proposed method for dewaxing sunflower oil which proceeded by treatment of crude sunflower seed oil with certain surfactants in combination with degumming agents was found to remove approximately 80% of the waxes. However, this oil is still commercially unacceptable since it is found to cloud when stored at room temperature and especially when placed in a chilled refrigerated environment.

SUMMARY OF THE INVENTION

According to the process of the present invention, the wax fraction of a high wax content vegetable oil is essentially completely removed by a simple and direct treatment utilizing standard commercial equipment. The treatment can be processed on crude or refined oil and the finished, dewaxed oil is found to be stable for several days at room temperature without evidence of clouding or precipitation of waxes. The system of the invention involves forming an emulsion of the oil with a mixture of synthetic, organic surfactants in critical concentration and preferably in the presence of a phosphate degumming agent, centrifuging and washing the oil. The preferred combination of surfactants is contained in an aqueous solution in an amount of 10–20% water on the basis of oil in which is dissolved from 1 to 100 ppm of sulfosuccinate alkyl ester, from 0.01 to 0.5% of a fatty acid alkyl sulfate and from 0.1 to 1% of an inorganic phosphate degumming agent. The process is found to require operation at a temperature of from 60°–90° F, preferably from 70°–80° F, and may be operated continuously by metering the aqueous solution of surfactants and degumming agent into the oil stream as it enters a continuous centrifuge.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
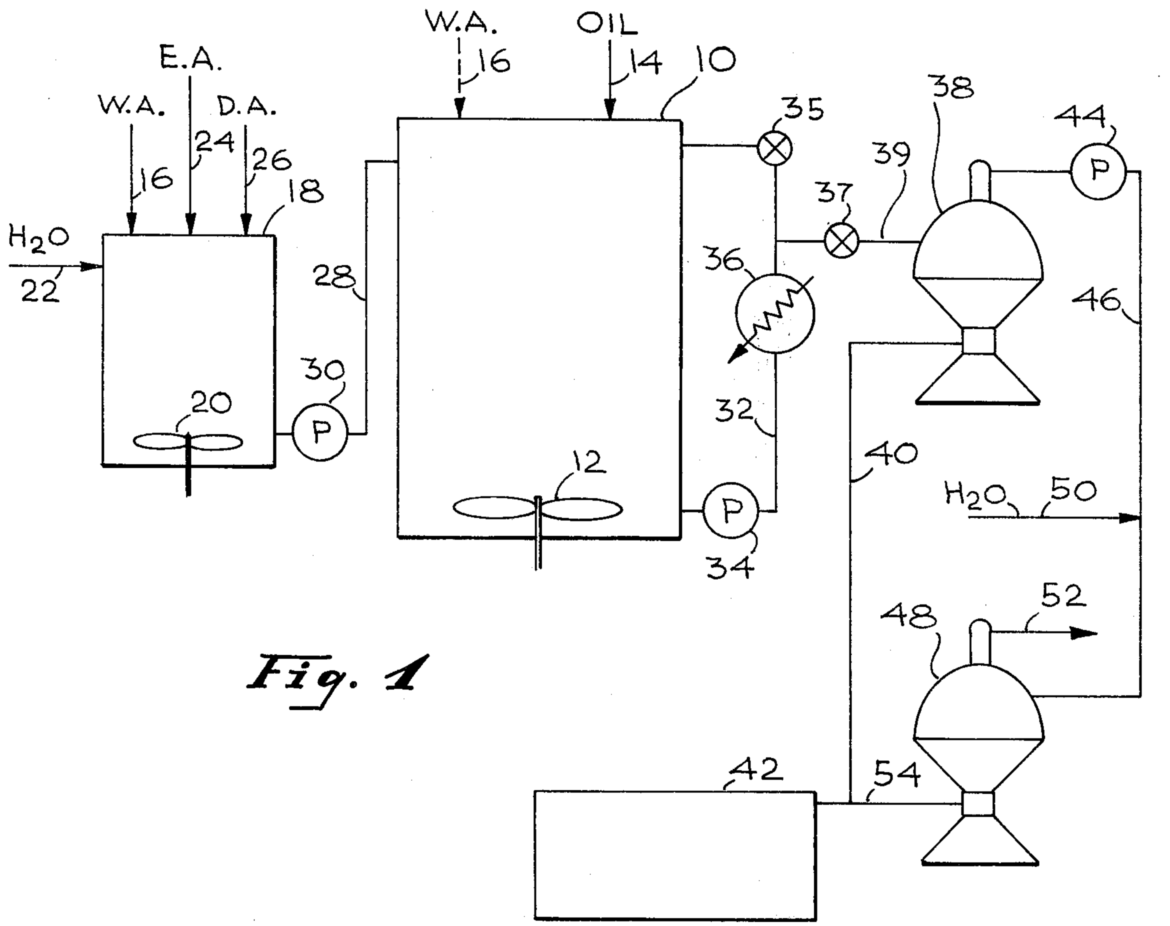
FIG. 1 is a schematic view of a vegetable oil dewaxing system in accordance with the invention.

An emulsion of the vegetable oil, surfactants and water is formed in feed tank 10 containing a mixing element 12. The oil is fed in through line 14 and optionally the wetting agent (W.A.) may be introduced through line 16 in solid form or predissolved in a portion of the vegetable oil. Alternatively the wetting agent can be predissolved in water in makeup tank 18 which contains a mixing element 20. Water in amount of 5–25% by weight based on oil is introduced into tank 18 through line 22 while the dispersing or emulsifying agent (E.A.) and the degumming agent (D.A.) are added at 24 and 26, respectively. When the aqueous treating mixture is completely dissolved, it is pumped through line 28 by means of pump 30 into the supply tank 10.

The mixture in tank 10 is mixed for about 30 minutes while circulating the mixture through line 32 containing heat exchanger 36 by means of pump 34 with valve 35 open and valve 37 closed to assure that the oil is at a temperature below 80° F. After a suitable period of mixing to form an emulsion, valve 35 is closed and valve 37 is opened and the treated oil emulsion is pumped by means of pump 34 through line 39 into continuous centrifuge 38. The waxy aqueous phase is removed through line 40 and collects in tank 42 while the dewaxed oil is pumped by means of pump 44 through line 46 to secondary wash centrifuge 48 in which a regulated amount of wash water is added through line 50. The dewaxed oil is recovered through line 52 for further processing such as caustic refining, bleaching with bleaching earth and vacuum steam deodorizing to provide a finished, dewaxed oil product. The wash water removed through line 54 may be collected in tank 42.

Figure 2:
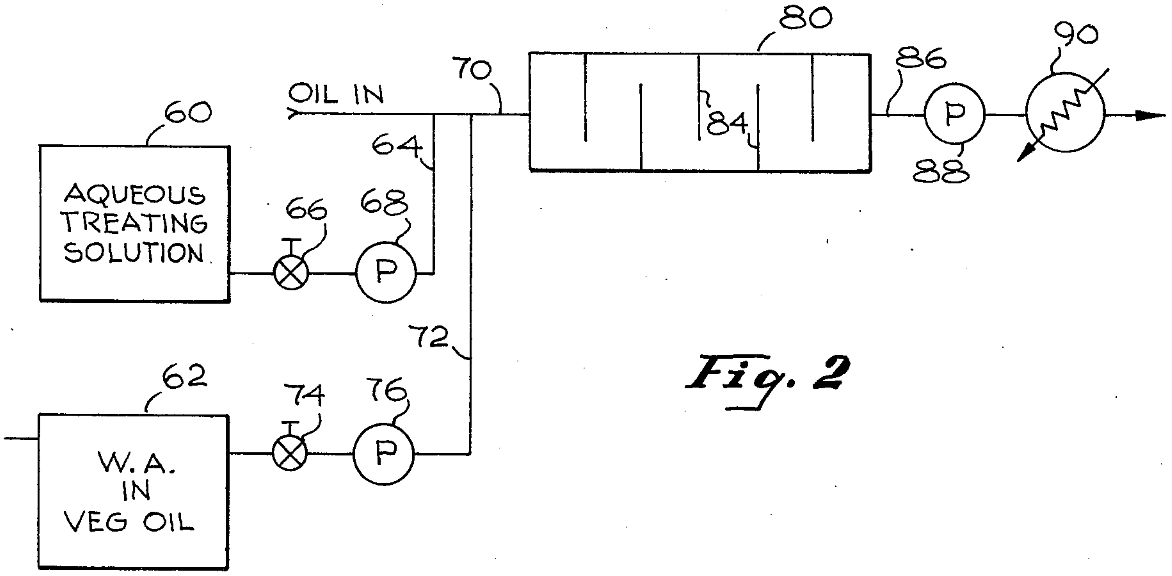
FIG. 2 is a schematic view of a continuous embodiment of a vegetable oil dewaxing system in accordance with the invention.

In the continuous embodiment illustrated in FIG. 2, an aqueous treating solution containing water, emulsifying agent and the degumming agent are made up in tank 60 while the wetting agent is dissolved in a portion of the vegetable oil in tank 62. The treating solution is pumped through line 64 containing metering valve 66 and pump 68 into the oil delivery line 70 while the wetting agent oil solution is pumped into line 70 through line 72 containing metering valve 74 and pump 76. The crude vegetable oil in line 70 containing the metered treating agents flows through a contactor 80 in which turbulent mixing of the oil and treating agents is effected to form an emulsion. Suitably the contactor contains a series of spaced baffling elements 84 to effect the desired mixing and emulsification of the mixture. The emulsified oil mixture flows through line 86 containing pump 88 and cooler 90 to the primary separation centrifuge and then to the secondary wash centrifuge for processing as described with respect to FIG. 1.

The dewaxing process of the invention is particularly useful with vegetable oils containing a high amount of wax, usually over 50 ppm to about 2,000 ppm. Though the dewaxing process may be conducted on crude or finished oil, it is preferably practiced on the crude vegetable oils. With crudes having a very high phosphatide content over about 300 ppm, it may be preferable to degum the crude before it is dewaxed. In general, the process is practiced on those vegetable oils containing over 50 ppm insoluble wax in finished product causing haze and loss of brilliance. Representative crude oils that may be processed in accordance with the invention are soybean, sunflower, peanut, cottonseed, rapeseed, sesame and safflower and particularly sunflower oil.

Crude sunflower oil generally has a free fatty acid content of about 0.5 to 0.7%, a phosphorous content of about 100–300 ppm and a wax content of about 200–1,000 ppm. The I.V. generally ranges from about 133 to 135 and the fatty acids are mainly about 90% $C_{18}$, about 6–7% of $C_{16}$ fatty acids and small amounts of $C_{12}$, $C_{14}$ and $C_{20}$ fatty acids. An analysis of crude sunflower oil from four different batches are provided in the following table.

TABLE 1

| Batch | 1 | 2 | 3 | 4 |
|---|---|---|---|---|
| FFA (%) | 0.69 | 0.66 | 0.66 | 0.60 |
| Phosphorous (ppm) | 260.00 | 189.00 | 179.00 | 135.00 |
| Waxes (ppm) | 470.00 | 490.00 | 540.00 | 390.00 |
| Calculated I.V. | 133.7 | 134.3 | 133.3 | 135.1 |
| Fatty Acid Content (%) | | | | |
| 12:0 | 0.20 | — | — | — |
| 14:0 | 0.24 | 0.03 | 0.02 | 0.01 |
| 16:0 | 6.43 | 5.99 | 6.45 | 6.10 |
| 16:1 | 0.08 | 0.10 | 0.10 | 0.07 |
| 18:0 | 4.05 | 4.23 | 4.23 | 4.10 |
| 18:1 | 23.56 | 23.69 | 25.34 | 24.21 |
| 18:2 | 64.76 | 65.16 | 62.80 | 64.56 |
| 18:3 | 0.53 | 0.44 | 1.02 | 0.93 |
| 20:0 | 0.20 | 0.30 | 0.03 | Trace |
| Others | 0.04 | 0.06 | 0.01 | 0.02 |
| Total | 100.00 | 100.00 | 100.00 | 100.00 |

The dewaxing, refining technique of the invention is based on solubility characteristics, polar nature and hydrophilic properties of the wax component of the oil. The composition of the wax is not completely known and it is somewhat dependent on the extraction technique. The waxes are generally composed of esters of fatty acids and alcohols which are not branched and have chain lengths from $C_{18}$ to $C_{32}$, thus forming linear molecules containing from 50–60 carbon atoms. These molecules differ from triglycerides by the linear structure and the greater number of carbon atoms. The ester function in the mid-point of the chain provides the molecules with a polar nature. The polarity is low when the wax molecules are in solution in the oil, that is at high temperatures above about 105° F. At these temperatures, their lipophilic characteristics predominate and they behave similarly to the triglycerides.

At lower temperatures, the mobility of the wax molecules within the triglyceride oil in which they are dissolved is reduced as is their lipophilic characteristic. At lower temperature, the intermolecular attractive and repulsive forces come into play and the polarity of the ester moiety and resulting hydrophilic properties permits the molecules to be concentrated at the interface between oil and water.

The concentrated wax molecules are removed in accordance with the invention by forming a water in oil emulsion and then separating the oil phase from the aqueous phase. The wax removal is maximized in accordance with the invention by a combination of selected synthetic, organic surfactants at particular concentrations.

The first surfactant present in an amount from 1–100 ppm and preferably from 5–25 ppm is a strong wetting agent capable of reducing the surface tension of water and also lowering the interfacial tension between water and another surface by collecting or aggregating at the solid-liquid or liquid-liquid interfaces. Preferred wetting agents are dialkyl sulfosuccinate esters of the formula:

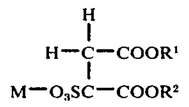

where $R^1$ and $R^2$ are alkyl of 4–12 carbon atoms and M is a water-soluble cation such as a Group I alkali metal, guanadine or ammonium. The preferred wetting agent is dioctyl sodium sulfosuccinate (DSS) which is the 2-ethyl hexanol ester.

The second surfactant is a true dispersing or emulsifying agent which promotes separation by overcoming cohesive forces between individual particles and has little effect on the surface tension of water. Representative emulsifying agents are fatty alkyl sulfate or lower alkyl-aryl sulfonate salts containing from 8–20 carbon atoms such as sodium lauryl sulfate, sodium cetyl sulfate, sodium stearyl sulfate, sodium oleyl sulfate, sodium diisopropyl- or sodium diisobutyl- naphthalene sulfonate.

As shown in Table 1, typical sunflower oil contains a fair amount of phospholipid gum in the amount usually about 100–300 ppm. When sunflower oil is degummed at 20° C, a substantial amount of the waxes were simultaneously removed from the oil indicating that the phospholipids adsorbed wax, more mechanically precipitated the wax during degumming and also is indicative that the steps of degumming and dewaxing could be combined to simultaneously remove these two fractions from the crude oil and that the process can be conducted early in the refining sequence which will also minimize the amount of wash water to remove these surface active agents. It has been discovered that at the same temperature conditions practiced for dewaxing, the addition of about 0.05 to 0.5, preferably 0.1 to 0.2%, by volume of an effective degumming agent such as phosphoric acid, sodium hexametaphosphate or sodium tripolyphosphate will result in the simultaneous removal of the phospholipids from the oil.

The invention will now be illustrated by examples of practice, it being understood that the starting materials, treating agents, proportions and conditions of operation may readily be varied by those skilled in the art without departing from the invention.

EXAMPLE 1 a. A stock solution containing 1% sodium lauryl sulfate and 4% sodium hexametaphosphate was dissolved in deionized water. 1,200 lbs. per hour treating solution were blended intimately to form an emulsion with 24,000 lbs. of sunflower seed oil per hour which contained 0.28 weight percent wax. The emulsion was processed through a DeLaval continuous centrifuge and the separated oil was washed in a secondary wash centrifuge. When the treated oil stood at room temperature, it clouded in a matter of hours. (b) 10 ppm of sodium dioctyl sulfosuccinate was added to the treating solution. The recovered oil was completely wax-free and was brilliant and clear and after seven days at ambient temperature there was no evidence of crystallization, haze nor loss of brilliance. (c) Example 1(*b*) was repeated increasing the DSS content to 25 ppm on the basis of the oil. The emulsion was much tighter and harder to break requiring more energy and longer processing time in the centrifuge.

During the dewaxing process, effluent from the DeLaval centrifuge was collected and analyzed for its neutral oil content to determine oil loss during the process. Detailed results are shown in the following table.

Table 2

| | Oil Sample 1 | 2 | 3 | 4 |
|---|---|---|---|---|
| % Wash Water | 11 | 18 | 23 | 65 |
| Feed Rate (lbs/hr) | 275.7 | 277.8 | 249.8 | 274.1 |
| Effluent Rate (lbs/hr) | 35 | 60 | 72 | 337 |
| % Neutral Oil in Effluent | 16.3 | 4.6 | 3.9 | 12.2 |
| Oil in Effluent (lbs/hr) | 5.7 | 2.8 | 2.8 | 41.1 |
| % Dewaxing Loss | 2.1 | 1.0 | 1.1 | 14.9 |

The above table demonstrates that minimum dewaxing loss is accomplished with 18–20% wash water.

EXAMPLE 2

A plant run was conducted in which 600,000 lbs. of crude sunflower seed oil was blended with 30,000 lbs. of an aqueous treating solution containing 1% sodium lauryl sulfate, 4% sodium hexametaphosphate and 95% deionized water. The oil was processed and the apparatus as described in FIG. 1 in which the mixture was blended with continuous circulation of the mixture through the heat exchanger to maintain the emulsion at a temperature below 75° F. The emulsion was then processed in a train of six primary centrifuges in parallel and then water washed with cold water at a temperature of 60°–65° F at a rate of 6,000 lbs./hr. through a set of six secondary wash centrifuges in parallel. The recovered oil was clear and brilliant and showed no evidence of hazing or loss of brilliance after seven days at room temperature and the oil loss in the process was about 5%.

440 gallon batches of crude sunflower oil were processed in a pilot plant scale dewaxing process. The batches were processed under control conditions and under varying input and output centrifuge temperatures and percent wash water. In each case, the treating solution was an aqueous solution containing 0.05% sodium lauryl sulfate and 0.02% sodium hexametaphosphate and containing either no DDS or 10 or 25 ppm DSS. The results are shown in the following table.

Table 3

Pilot Scale Dewaxing Process Conditions vs. Wax Contents

| Type of Dewaxing Process | Sample No. | Type of Surfactants | Centrifuge Temp., ° F In | Out | % Wash Water | Wax Contents (ppm) Crude Oil | Finished Oil |
|---|---|---|---|---|---|---|---|
| Batch No. 1 | Control | — | — | — | — | 390 | — |
| | 1 | NaLS* NaHMP** | 75 | 92.5 | — | 260 | 100 |
| | 2 | " | 70 | 78.5 | 57 | 370 | 80 |
| | 3 | " | 65 | 75 | 82 | 210 | 100 |
| Batch No. 2 | Control | — | — | — | — | 20 | 40 |
| | 1 | NaLS NaHMP | 65 | 76 | 22 | 40 | 50 |
| | 2 | " | 65 | 76 | 32 | 10 | 70 |
| | 3 | " | 65 | 75 | 55 | 30 | 140 |
| Batch No. 3 | Control | — | — | — | — | 960 | 420 |
| | 1 | NaLS NaHMP DSS (25 ppm) | 64 | 73 | 67 | — | 720 |
| Batch No. 4 | Control | — | — | — | — | 790 | 1940 |
| | 1 | NaLS NaHMP DSS (10 ppm) | 65 | 77 | 11 | — | 30 |
| | 2 | " | 65 | 76 | 18 | — | 20 |

Table 3-continued

| Type of Dewaxing Process | Sample No. | Type of Surfactants | Pilot Scale Dewaxing Process Conditions vs. Wax Contents — Centrifuge Temp., ° F In | Out | % Wash Water | Wax Contents (ppm) Crude Oil | Finished Oil |
|---|---|---|---|---|---|---|---|
| | 3 | " | 65 | 75 | 23 | — | 20 |
| | 4 | " | 65 | 73 | 65 | — | 40 |
| Continuous No. 1 | Control | — | — | — | — | 680 | 1280 |
| | 1 | NaLS NaHMP DSS (10 ppm) | 69 | 78.5 | 13 | — | 860 |
| | 2 | " | 69 | 77.5 | 17 | — | 1220 |
| | 3 | " | 67 | 75.5 | 21 | — | 530 |

*Na-Lauryl Sulfate
**Na-Hexametaphosphate

As can be seen from Table 3, treating solutions of batches 1 and 2 containing no DSS were only able to remove a maximum of 80% of the wax from the oil. In batch 3 containing 25 ppm of DSS, the wax removal was inefficient because of the inability to break the emulsion. However, in batch 4 which was processed with 10 ppm of DSS, the treated oil was essentially wax-free. Batch 5 which was processed in a continuous manner as per FIG. 2, demonstrated fairly efficient wax removal and batches 4 and 5 showed no hazing, crystallization or loss of brilliance after standing seven days at room temperature. The was contents presented in Table 3 were determined gravimetrically.

It is to be understood that only preferred embodiments of the invention have been described and that numerous substitutions, modifications and alterations are all permissible without departing from the spirit and scope of the invention as defined in the following claims.

What is claimed is:

1. A method of dewaxing a high wax content sunflower oil comprising the steps of:

adding to the oil 5–25% by weight based on the oil of an aqueous treating agent including 0.05 to 5% by weight of an inorganic phosphate degumming agent and a mixture of surfactants comprising 5 to 25 ppm of a sulfosuccinate alkyl ester and 0.01 to 0.5% by weight of a second surfactant selected from fatty acid sulfate and lower alkyl-aryl sulfonate salts containing from 8–20 carbon atoms;

mixing the oil-aqueous treating agent mixture at a temperature of 60° to 90° F to form an emulsion; and centrifuging the emulsion to separate a wax containing aqueous phase from the oil.

2. A method according to claim 1 in which the oil contains from 50–2000 ppm of unsoluble wax.

3. A method according to claim 2 in which the aqueous treating agent is present in an amount from 10–20% by weight based on the amount of oil, the oil is crude sunflower oil and the temperature of the emulsion is maintained at 70° to 80° F before centrifuging.

4. A method according to claim 3 in which the sulfosuccinate alkyl ester is present in an amount from 5 to 25 ppm and is selected from compounds of the formula:

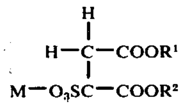

where $R^1$ and $R^2$ are alkyl of 4–12 carbon atoms and M is a water-soluble cation selected from a Group I alkali metal, guanadine or ammonium.

5. A method according to claim 4 in which the second surfactant is present in an amount from 0.01 to 0.5% by weight and is sodium lauryl sulfate, sodium cetyl sulfate, sodium stearyl sulfate, sodium oleyl sulfate, sodium diisopropyl- or sodium diisobutyl- naphthalene sulfonate.

6. A method according to claim 5 in which the degumming agent is present in an amount from 0.1 to 0.2% by weight and is selected from phosphoric acid, sodium hexametaphosphate or sodium tripolyphosphate.

7. A method according to claim 5 in which the sulfosuccinate ester is dioctyl sodium sulfosuccinate which is present in an amount from 5–25 ppm.

8. A method according to claim 7 in which the temperature of the emulsion is maintained between 70°–80° F before centrifugation and the second surfactant is sodium lauryl sulfate.

9. A method according to claim 2 further including the step of washing the separated oil.

10. A method according to claim 9 further including the steps of continuously metering controlled amounts of water and the surfactants into a flowing stream of oil, intimately mixing the surfactants and water therein to form an emulsion and continuously centrifuging said emulsion.

* * * * *